US009030330B1

(12) United States Patent
Nichols, Jr.

(10) Patent No.: US 9,030,330 B1
(45) Date of Patent: May 12, 2015

(54) CARBON MONOXIDE SAFETY DEVICE

(71) Applicant: Ronald Nichols, Jr., Middlebury, CT (US)

(72) Inventor: Ronald Nichols, Jr., Middlebury, CT (US)

( * ) Notice: Subject to any disclaimer, the term of this patent is extended or adjusted under 35 U.S.C. 154(b) by 50 days.

(21) Appl. No.: 13/762,773

(22) Filed: Feb. 8, 2013

(51) Int. Cl.

| | |
|---|---|
| ***G08B 17/10*** | (2006.01) |
| ***G08B 21/12*** | (2006.01) |
| ***G05B 19/042*** | (2006.01) |

(52) U.S. Cl.
CPC ............ *G08B 21/12* (2013.01); *G05B 19/0428* (2013.01)

(58) Field of Classification Search
CPC ..... G08B 21/14; G08B 21/12; G05B 19/0428
USPC ......... 340/632, 531, 506, 679, 628, 584, 577, 340/629, 638, 539.26, 693.6; 307/116; 137/78.1; 73/23.34, 31.01, 31.02, 73/31.03
See application file for complete search history.

(56) References Cited

U.S. PATENT DOCUMENTS

| | | | | |
|---|---|---|---|---|
| D350,300 | S | 9/1994 | Browning et al. | |
| 5,576,739 | A | 11/1996 | Murphy | |
| 6,025,788 | A | 2/2000 | Diduck | |
| 6,110,038 | A | 8/2000 | Stern | |
| 6,339,379 | B1 | 1/2002 | Argus et al. | |
| 6,374,850 | B1 | 4/2002 | Timm | |
| 6,774,802 | B2 * | 8/2004 | Bachinski et al. | 340/632 |
| D553,521 | S | 10/2007 | Morgan | |
| 7,579,956 | B2 * | 8/2009 | Chapman et al. | 340/632 |
| 2004/0160329 | A1 * | 8/2004 | Flanc | 340/632 |
| 2006/0044133 | A1 | 3/2006 | Lou | |
| 2013/0093593 | A1 * | 4/2013 | Woods | 340/628 |

* cited by examiner

*Primary Examiner* — Toan N Pham

(57) ABSTRACT

A carbon monoxide safety device detects levels of carbon monoxide producible by a device and deactivates the device upon detection of a predetermined level of carbon monoxide. The device includes a housing and a processor coupled to the housing. A plurality of wires is electrically coupled to the processor. A sensor is operationally coupled to the processor wherein the sensor measures a level of carbon monoxide. A switch is operationally coupled to the sensor wherein the sensor sends a deactivation signal to the switch to deactivate the source of carbon monoxide upon the sensor detecting a predetermined level of carbon monoxide.

11 Claims, 3 Drawing Sheets

CARBON MONOXIDE SAFETY DEVICE

BACKGROUND OF THE DISCLOSURE

Field of the Disclosure

The disclosure relates to safety devices and more particularly pertains to a new safety device for detecting levels of carbon monoxide producible by a device and deactivating the device upon detection of a predetermined level of carbon monoxide.

SUMMARY OF THE DISCLOSURE

An embodiment of the disclosure meets the needs presented above by generally comprising a housing and a processor coupled to the housing. A plurality of wires is electrically coupled to the processor. A sensor is operationally coupled to the processor wherein the sensor measures a level of carbon monoxide. A switch is operationally coupled to the sensor wherein the sensor sends a deactivation signal to the switch to deactivate the source of carbon monoxide upon the sensor detecting a predetermined level of carbon monoxide.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
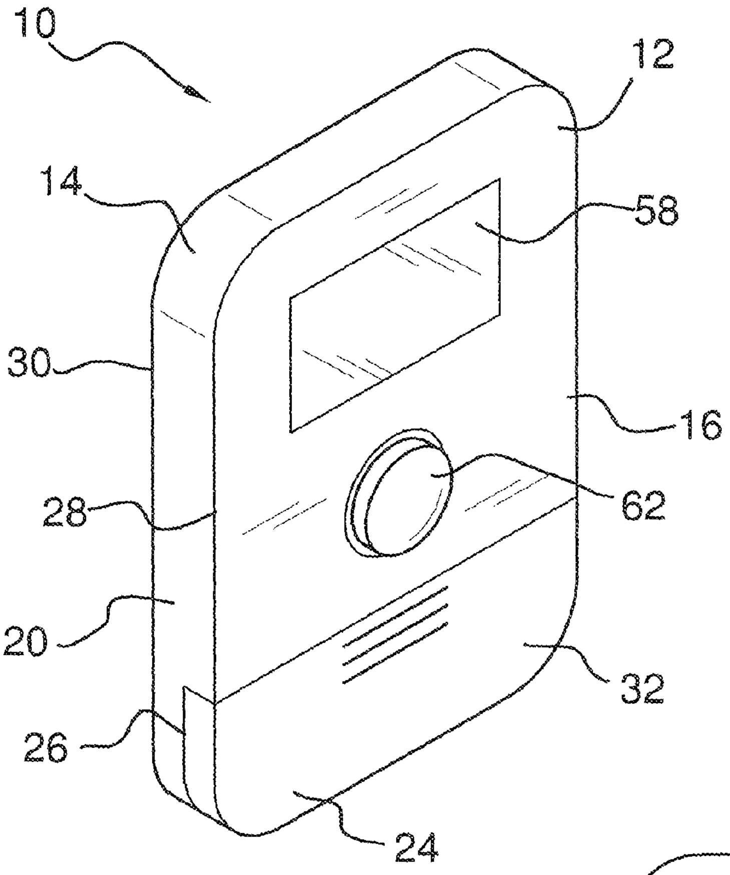
FIG. 1 is a top front side perspective view of a carbon monoxide safety device according to an embodiment of the disclosure.
Figure 2:
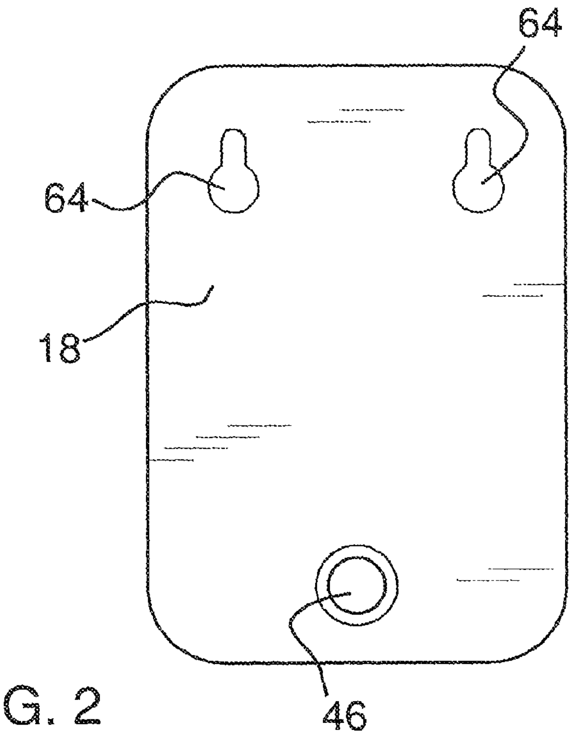
FIG. 2 is a back view of an embodiment of the disclosure.
Figure 3:
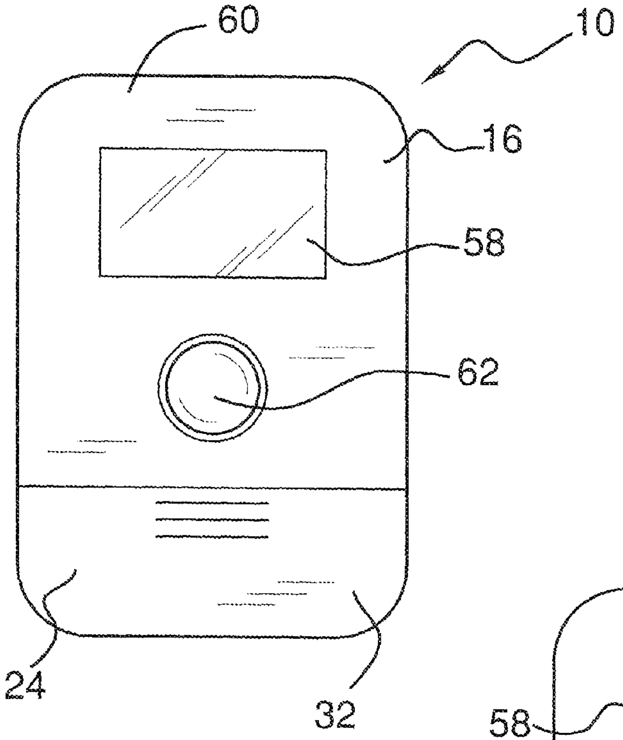
FIG. 3 is a front view of an embodiment of the disclosure.
Figure 4:
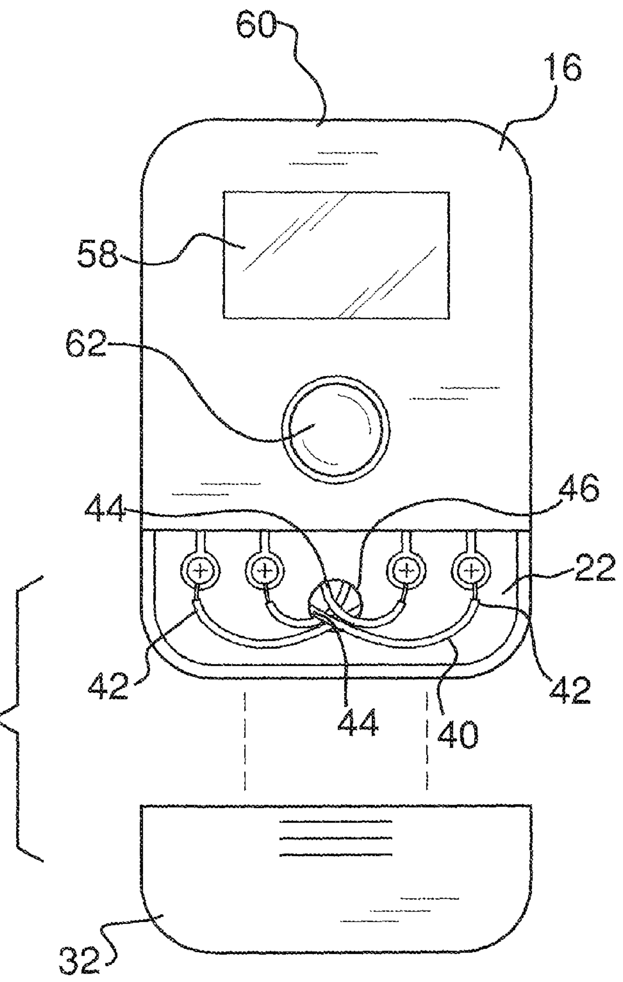
FIG. 4 is a partially-exploded front view of an embodiment of the disclosure.
Figure 5:
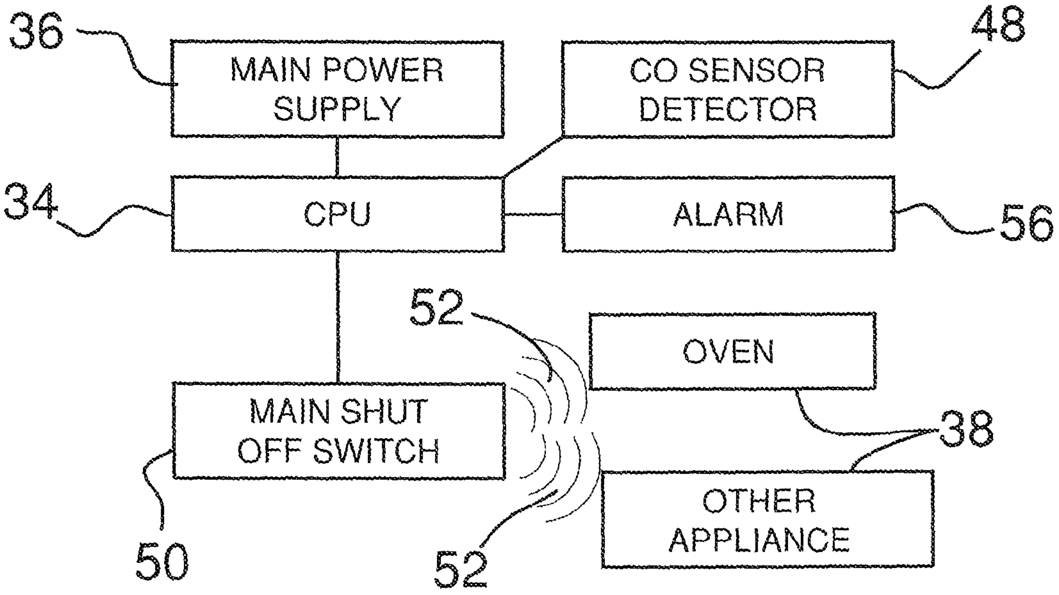
FIG. 5 is a schematic block diagram of an embodiment of the disclosure.

With reference now to the drawings, and in particular to FIGS. 1 through 5 thereof, a new safety device embodying the principles and concepts of an embodiment of the disclosure and generally designated by the reference numeral 10 will be described.

As best illustrated in FIGS. 1 through 5, the carbon monoxide safety device 10 generally comprises a housing 12. The housing 12 is substantially rectangular. The housing 12 is preferably made from molded plastic. The housing 12 has a plurality of rounded edges 14. The housing 12 has a front side 16 positioned opposite a back side 18 and a perimeter wall 20 extending between the front side 16 and the back side 18. An opening 22 extends across a bottom end 24 of the housing 12 and across the perimeter wall 20 of the housing 12. The opening 22 extends to a midpoint 26 positioned between the front side 16 and the back side 18 of the housing 12 wherein the midpoint 26 is positioned between a perimeter edge 28 of the front side 16 of the housing 12 and a perimeter edge 30 of the back side 18 of the housing 12. The opening 22 is positioned opposite the bottom end 24 of the back side 18 of the housing 12. A cover 32 is coupled to the housing 12. The cover 32 is selectively positionable such that the cover 32 closes the opening 22.

A processor 34 is coupled to the housing 12. A power source 36 is electrically couplable to a heating appliance 38 wherein the heating appliance 38 is capable of producing carbon monoxide. The heating appliance 38 may be a furnace, boiler, oven, or similar heating appliance 38. A plurality of wires 40 electrically couples the processor 34 to the power source 36. A first end 42 of the wires 40 is housed in the opening 22. A wiring entrance 46 is coupled to the housing 12 wherein a second end 44 of each of the wires 40 is configured to extend through the wiring entrance 46 when the first end 42 of the wires 40 is housed in the opening 22. A sensor 48 is operationally coupled to the processor 34 wherein the sensor 48 measures a level of carbon monoxide. A switch 50 is operationally coupled to the sensor 48 wherein the sensor 48 sends a deactivation signal 52 to the switch 50 upon the sensor 48 detecting a predetermined level of carbon monoxide 54. An audible alarm 56 is operationally coupled to the processor 34 wherein the processor 34 activates the alarm 56 upon the sensor 48 sending the deactivation signal 52 to the switch 50 when the sensor 48 detects the predetermined level of carbon monoxide 54. The device 10 is useful in homes without a carbon monoxide detector or for those people who fail to change the batteries in their carbon monoxide detector.

A display 58 is coupled to the housing 12. The display 58 is coupled to a top end 60 of the housing 12. The display 58 is coupled to the front side 16 of the housing 12 wherein the display 58 is configured for displaying the level of carbon monoxide. The display 58 is digital. The display 58 preferably displays the level of carbon monoxide in units of parts per million (ppm). A control button 62 is coupled to the housing 12. The control button 62 is positioned between the display 58 and the opening 22. The control button 62 is operationally coupled to the switch 50 wherein selectively manipulating the control button 62 closes the switch 50 and restores operation of the heating appliance 38. A pair of apertures 64 is coupled to the housing 12. The apertures 64 are positioned on the back side 18 of the housing 12 wherein the apertures 64 are configured for mounting of the housing 12.

The housing 14 may be mounted on or near the heating appliance 38. If the housing 14 is mounted on the heating appliance 38, an enclosure may have to surround the housing 14 to ensure that the housing 14 can withstand heat produced from the heating appliance 38. Alternatively, the switch 50 may be integrated into a thermostat wherein the thermostat has a display 58 indicating the level of carbon monoxide. The housing 12 preferably has a height between approximately 10 centimeters and 25 centimeters. The housing 12 preferably has a length between approximately 5 centimeters and 20 centimeters. The housing 12 preferably has a width between approximately 1 centimeter and 15 centimeters. The device 10 is modified for line voltage and is preferably powered by 115 Volt line voltages.

In use, as stated above and shown in the Figures, the sensor measures the level of carbon monoxide, which is then displayed on the display 58. When the sensor 48 detects a predetermined level of carbon monoxide 54, the sensor 48 sends a deactivation signal 52 to the switch 50 and activates the audible alarm 56. To restore operation of the heating appliance 38 thereafter, a person must selectively manipulate the control button 62 to close the switch 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A carbon monoxide safety device comprising:

a housing;

a processor coupled to said housing;

a plurality of wires electrically coupled to said processor;

a sensor operationally coupled to said processor wherein said sensor measures a level of carbon monoxide;

a switch operationally coupled to said sensor wherein said sensor sends a deactivation signal to said switch to deactivate the source of carbon monoxide upon said sensor detecting a predetermined level of carbon monoxide;

a power source electrically coupled to a heating appliance wherein the heating appliance is capable of producing carbon monoxide, a plurality of wires electrically coupling said processor to said power source; and said housing being mounted on said heating appliance wherein said sensor monitors the heating appliance to determine levels of carbon monoxide produced from the heating appliance.

2. The device of claim 1, further comprising said switch being integrated into a thermostat.

3. The device of claim 1, further comprising an opening extending across a bottom end and a perimeter wall of said housing, a first end of said wires being housed in said opening.

4. The device of claim 3, further comprising a wiring entrance coupled to said housing wherein a second end of each of said wires is configured to extend through said wiring entrance when said first end of said wires is housed in said opening.

5. The device of claim 3, further comprising a cover coupled to said housing, said cover being selectively positionable such that said cover closes said opening.

6. The device of claim 1, further comprising an audible alarm operationally coupled to said processor wherein said processor activates said alarm upon said sensor sending said deactivation signal to said switch when said sensor detects said predetermined level of carbon monoxide.

7. The device of claim 1, further comprising a display coupled to said housing, said display being coupled to a top end of said housing, said display being coupled to a front side of said housing wherein said display is configured for displaying said level of carbon monoxide.

8. The device of claim 7, further comprising said display being digital.

9. The device of claim 1, further comprising a control button coupled to said housing, said control button being operationally coupled to said switch wherein selectively manipulating said control button closes said switch.

10. The device of claim 1, further comprising a pair of apertures coupled to said housing, said apertures being positioned on a back side of said housing wherein said apertures are configured for mounting of said housing.

11. A carbon monoxide safety device comprising:

a housing, said housing being substantially rectangular, said housing having a plurality of rounded edges, said housing having a front side positioned opposite a back side and a perimeter wall extending between said front side and said back side;

an opening extending across a bottom end of said housing and across said perimeter wall of said housing, said opening extending to a midpoint positioned between said front side and said back side of said housing wherein said midpoint is positioned between a perimeter edge of said front side of said housing and a perimeter edge of said back side of said housing, said opening being positioned opposite said bottom end of said back side of said housing;

a cover coupled to said housing, said cover being selectively positionable such that said cover closes said opening;

a processor coupled to said housing;

a power source electrically couplable to a heating appliance wherein the heating appliance is capable of producing carbon monoxide;

a plurality of wires electrically coupling said processor to said power source, a first end of said wires being housed in said opening;

a sensor operationally coupled to said processor wherein said sensor measures a level of carbon monoxide;

a switch operationally coupled to said sensor wherein said sensor sends a deactivation signal to said switch upon said sensor detecting a predetermined level of carbon monoxide;

an audible alarm operationally coupled to said processor wherein said processor activates said alarm upon said sensor sending said deactivation signal to said switch when said sensor detects said predetermined level of carbon monoxide;

a display coupled to said housing, said display being coupled to a top end of said housing, said display being coupled to said front side of said housing wherein said display is configured for displaying said level of carbon monoxide, said display being digital;

a control button coupled to said housing, said control button being positioned between said display and said opening, said control button being operationally coupled to said switch wherein selectively manipulating said control button closes said switch and restores operation of the heating appliance;

a pair of apertures coupled to said housing, said apertures being positioned on said back side of said housing wherein said apertures are configured for mounting of said housing; and a wiring entrance coupled to said housing wherein a second end of each of said wires is configured to extend through said wiring entrance when said first end of said wires is housed in said opening.

* * * * *